(12) United States Patent
Subbannavar et al.

(10) Patent No.: US 9,403,170 B2
(45) Date of Patent: Aug. 2, 2016

(54) COUPLING MECHANISM FOR A MILLING APPARATUS

(76) Inventors: Chaithanya B. Subbannavar, Bangalore (IN); Naveen H. C. Kumar, Bangalore (IN)

(*) Notice: Subject to any disclaimer, the term of this patent is extended or adjusted under 35 U.S.C. 154(b) by 470 days.

(21) Appl. No.: 13/817,397

(22) PCT Filed: Oct. 27, 2010

(86) PCT No.: PCT/IN2010/000697
§ 371 (c)(1),
(2), (4) Date: Mar. 29, 2013

(87) PCT Pub. No.: WO2012/056460
PCT Pub. Date: May 3, 2012

(65) Prior Publication Data
US 2013/0200192 A1    Aug. 8, 2013

(51) Int. Cl.
*B02C 23/00* (2006.01)
*B02B 3/04* (2006.01)
*F16D 1/06* (2006.01)

(52) U.S. Cl.
CPC . *B02C 23/00* (2013.01); *B02B 3/04* (2013.01); *F16D 1/06* (2013.01); *F16D 2001/062* (2013.01)

(58) Field of Classification Search
CPC ........... B02C 23/00; B02C 18/16; F16D 1/06; F16D 2001/062; B02B 3/04
USPC ........................................ 241/293
See application file for complete search history.

(56) References Cited

U.S. PATENT DOCUMENTS

| | | | |
|---|---|---|---|
| 3,708,844 A | 1/1973 | Rawson | 29/123 |
| 5,142,784 A | 9/1992 | Lee et al. | 29/895.21 |
| 5,722,888 A | 3/1998 | Lane | 460/114 |
| 7,296,763 B2 | 11/2007 | Bliss et al. | 241/293 |

OTHER PUBLICATIONS

International Search Report and Written Opinon for PCT/IN2010/000697, dated Dec. 13, 2011.

*Primary Examiner* — Mark Rosenbaum
(74) *Attorney, Agent, or Firm* — Brinks Gilson & Lione

(57) ABSTRACT

A coupling mechanism for an abrasive roll assembly placed inside an apparatus to couple the abrasive roll assembly along its axial center with the axial center of the apparatus, the coupling mechanism comprising a locking disk placed along the abrasive roll assembly.

14 Claims, 3 Drawing Sheets

COUPLING MECHANISM FOR A MILLING APPARATUS

CROSS REFERENCE TO RELATED APPLICATIONS

This application claims the benefit of 35 U.S.C. §371 of International Application No. PCT/IN2010/000697, filed on Oct. 27, 2010, International Publication No. WO 2012/056460 A1, which is incorporated by reference herein.

FIELD OF INVENTION

The present invention generally relates to vertical abrasive type milling machine for food grains and is particularly related to locking disk mechanism to maintain constant gap between abrasive roll and perforated screens in the milling chamber.

BACKGROUND OF INVENTION

In the conventional abrasive type vertical milling machine grain is supplied to the milling chamber by screw conveyor and is milled in the milling chamber formed by abrasive roll assembly and cylindrical screen assembly. The screw conveyor is mounted on a main shaft extending vertically. The food grains hits the abrasive rolls in the milling chamber and milling action takes place. Milled food grains collected at bottom of milling chamber discharged through discharge disk. In the present machine all the abrasive roll assemblies are placed one over the other on the bottom plate and mounted on feed screw by long bolts.

One of the related arts discloses about a rice polishing machine of a vertical shaft and frictional type comprising a vertical tubular member having a perforated wall and a vertical shaft which is disposed in the tubular member and capable of being rotated therein with aid of a rotor. Thus, it teaches about having a shaft which may be confined to the bottom portion of the machine and may be rotated by means of pulley. Also, the perforation available on the vertical tubular member may enable the spiral rotor and the polishing rotor to be suspended therein.

One of the related arts disclosed about a vertical milling machine comprising milling parts and a main shaft wherein the rotation with alignment has been arrived at the bottom portion with aid of a rotation. Thus it teaches about having a rotation at the bottom of the shaft to maintain integrity of the milling machine and the shaft is present through out the milling machine and is being connected to all the rolls.

However, in all these existing arts, the abrasive roll assembly is rotated along the shaft present in it to which the abrasive roll assembly are coupled in appropriate position to enable it to rotate. In these types of milling machine, removing the abrasive roll assembly is difficult as they are coupled to the shaft through out. In addition removing the abrasive roll assembly disturbs the mechanical axial alignment and would cause lot to align the milling machine without which the milling machine cannot be made to function. Thus replacing and aligning the abrasive roll assembly along with the axis of the milling machine is too tedious and complex in these types of existing milling machines.

In the present machine it difficult to maintain alignment of axis of abrasive roll assemblies. Due to this it is difficult to maintain the constant gap between abrasive rolls and perforated screen in milling chamber.

Thus there arises a need for a milling apparatus wherein the abrasive roll assembly can be dismantled without disturbing the axial alignment and to couple it such that the axis of rotation can be achieved and thereby maintaining the integrity of the apparatus. Also, there arises a need to provide a rotation along with the locking of the abrasive roll assembly such that the rotation can be achieved with the intact coupling of the abrasive roll assembly along the axial centre of the milling apparatus.

OBJECT OF INVENTION

One object of the invention relating to the present invention is to provide a locking mechanism for a milling apparatus to lock the abrasive roll assembly with its previous one in the milling apparatus such that the mechanism firmly couples the abrasive roll assembly with its previous one and the mechanism aids and guides the abrasive roll assemblies to maintain a axis of rotation with respect to the milling apparatus thereby maintaining the integrity of the milling apparatus and preventing the abrasive roll assemblies from being misaligned from its axis of rotation.

Another object of the invention relating to the present invention is to provide a rotary mechanism for a milling apparatus such that all the abrasive roll assemblies of the milling apparatus can be rotated with respect to its axial centre without a mechanical axel running through all the abrasive roll assemblies thereby the rotary motion is intact with respect to the axis of rotation and thereby maintaining the integrity of the milling apparatus with respect to its rotation.

SUMMARY OF INVENTION

A coupling mechanism for an abrasive roll assembly placed inside an apparatus to couple the abrasive roll assembly along its axial centre with the axial centre of the apparatus, the coupling mechanism comprising a locking disk assembly placed along the abrasive roll assembly which is in association with the axial centre of the abrasive roll assembly. A shaft fixed along the axial centre of said locking disk such that said shaft and said locking disk have common centre of axis. A rotating means, the outer surface of which is fixed to the body of the apparatus to form the stationary end and the inner surface of which is fixed to the outer surface of a hollow guide and lock means to form the rotatable end such that said hollow guide and lock means is capable of being rotated with respect to said rotating means; and in the inner side of said hollow guide and lock means said shaft can be slide as desired to place said shaft in desired position inside said hollow guide and lock means and to hold it rigid in desired position inside said hollow guide and lock means wherein said locking disk can be moved as desired in accordance with said shaft movement such that said locking disk mates the abrasive roll assembly and holds the abrasive roll assembly intact with respect to the apparatus and that said shaft along with said locking disk can be rotated with respect to said rotating means and that the axis of rotation is along the axial centre of the apparatus.

A rotating mechanism for an apparatus to hold and to rotate a shaft the rotating mechanism comprising A hollow sleeve which has threading in its internal surface such that a shaft which has a mating thread on its external surface can be threaded along the axis of the sleeve. A bearing whose inner surface of is fixed to the outer surface the sleeve and the outer surface of the bearing is fixed to the apparatus. A retainer ring is fixed on to the bearing and the sleeve such that the shaft can pass though it and the bearing is intact with the sleeve and the apparatus; and a lock nut which can be threaded on to the shaft from the bottom of the sleeve such that the shaft can be locked at desired position in the sleeve wherein shaft can be rotated with respect to the bearing precisely in its centre of axis and the axis of rotation is the axial centre of the apparatus.

A milling apparatus comprising a locking disk assembly placed along an abrasive roll assembly which is in association with the axial centre of the abrasive roll assembly. A shaft fixed along the axial centre of said locking disk such that said shaft and said locking disk have common centre of axis. A rotating means the outer surface of which is fixed to the body of the milling apparatus to form the stationary end and the inner surface of which is fixed to the outer surface of a hollow guide and lock means to form the rotatable end such that said hollow guide and lock means is capable of being rotated with respect to said rotating means; and in the inner side of said hollow guide and lock means said shaft can be slide as desired to place said shaft in desired position inside said hollow guide and lock means and to hold it rigid in desired position inside said hollow guide and lock means wherein said locking disk can be moved as desired in accordance with said shaft movement such that said locking disk mates the abrasive roll assembly and holds the abrasive roll assembly intact with respect to the apparatus and that said shaft along with said locking disk can be rotated with respect to said rotating means and that the axis of rotation is along the axial centre of the milling apparatus.

The above said first object is achieved by coupling the circular locking disk to a shaft to form locking disk assembly and placing the locking disk assembly underneath last abrasive roll assembly. Said shaft has an external threading on it such that said shaft along with the abrasive roll assembly with aid of the locking disk assembly can be moved up and down on a sleeve which has internal mating thread for the shaft. At desired position the shaft can be locked by means of the lock nut which mates the shaft and the arrests the shaft movement by flushing its surface on the sleeve. The sleeve along with its assembly is fixed to the body of the milling apparatus with aid of the housing thereby enabling the outer region of the sleeve assembly to be stationary with the milling apparatus.

The above said second object is achieved by providing a bearing mechanism which is housed in the sleeve assembly and the sleeve assembly in turn is fixed to the body of the milling apparatus such that the sleeve can rotate along with last abrasive roll assembly which in turn makes all the abrasive roll assemblies to rotate with respect to the axis of bearing rotation. The bearing is mechanically connected only to the last abrasive roll assembly. As the axis of rotation for the bearing is aligned to the axis of the abrasive roll assemblies, the rotation of abrasive roll assemblies takes place without any physical axle being present for each abrasive roll assembly and thereby integrity of the milling apparatus too is maintained.

DETAILED DESCRIPTION OF DRAWINGS

Figure 1:
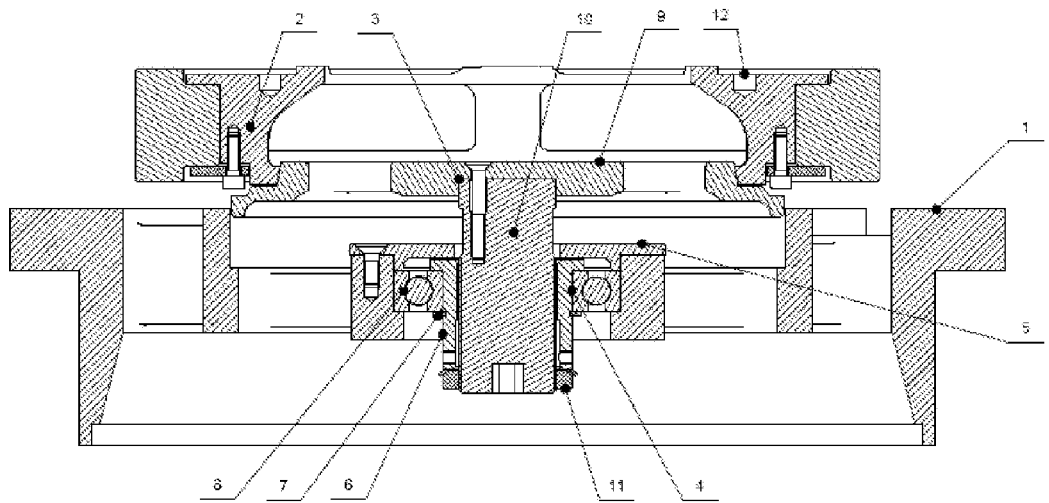
FIG. 1 illustrates a coupling mechanism in coupled condition in accordance with an exemplary embodiment of the present invention.
Figure 2:
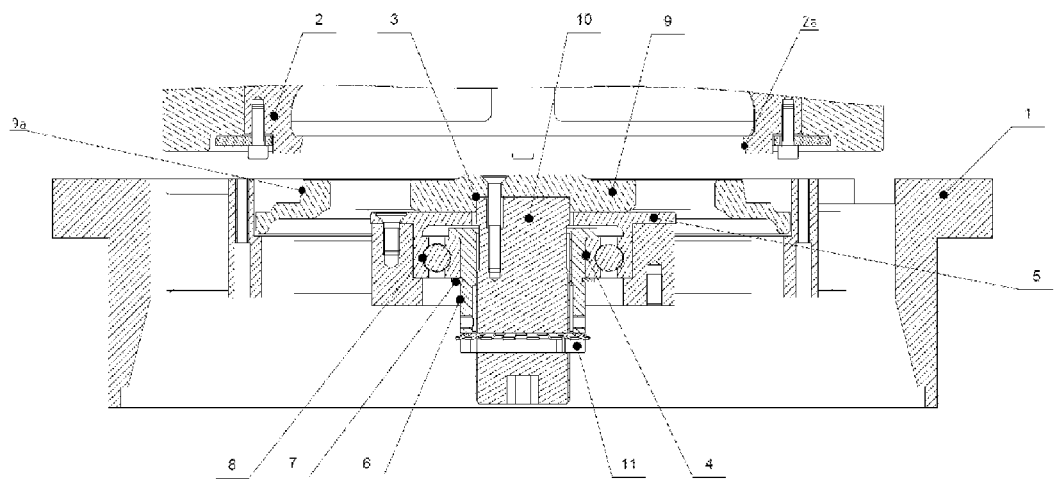
FIG. 2 illustrates a coupling mechanism in uncoupled condition in accordance with an exemplary embodiment of the present invention.

Referring to FIG. 1 and FIG. 2 a coupling mechanism in coupled condition and a coupling mechanism in uncoupled condition in accordance with exemplary embodiments of the present invention is illustrated respectively. This coupling mechanism is for coupling the last abrasive roll assembly with the last but one abrasive roll assembly present inside an apparatus such as milling apparatus. This is a coupling mechanism for an abrasive roll assembly placed inside an apparatus such as milling apparatus to couple the abrasive roll assembly along its axial centre with the axial centre of the apparatus. The coupling mechanism comprises a locking disk (9) placed along the abrasive roll assembly (2) which is in association with the axial centre of the abrasive roll assembly. A shaft (10) fixed along the axial centre of said locking disk such that said shaft and said locking disk have common centre of axis. The coupling mechanism comprises a rotating means (8), the outer surface of which is fixed to the body of the apparatus to form the stationary end with respect to the milling apparatus. The inner surface of rotating means is fixed to the outer surface of a hollow guide and lock means (6) to form the rotatable end such that the hollow guide and lock means is capable of being rotated with respect to said rotating means and in the inner side of said hollow guide and lock means the shaft can be slide as desired to place the shaft in desired position inside said hollow guide and lock means and to hold it rigid in desired position inside the hollow guide and lock means wherein the locking disk can be moved as desired in accordance with the shaft movement such that said locking disk mates the abrasive roll assembly and holds the abrasive roll assembly intact with respect to the milling apparatus and that the shaft along with said locking disk can be rotated with respect to said rotating means and that the axis of rotation is along the axial centre of the apparatus. In the coupling mechanism, the mating surfaces (2a; 9a) of the abrasive roll assembly and the locking disk are in sliding conical shape such that when the locking disk mates with the abrasive roll assembly it forms an intact mate and that the abrasive roll assembly is rigid with respect to the locking disk.

In the coupling mechanism, one or more holes have been provided on the surface of the last abrasive roll assembly facing the previous abrasive roll assembly such that when the locking disk is moved towards preferable upwards the last abrasive roll assembly the holes aligns with the respective pins present on the previous abrasive roll assembly thereby providing positive locking of the locking disk with the abrasive roll assembly.

In the coupling mechanism, the shaft has external left hand thread and the sleeve has internal left hand thread such that said thread on the shaft can mate with said thread inside sleeve and the shaft thereby can be threaded and moved inside or outside the sleeve to desired distance along the sleeve.

In the coupling mechanism, the centre of axes of the locking disk the shaft the rotating means and the guide and lock means are common and are same as that of the axes of the abrasive roll assembly and that of the apparatus thereby the integrity with respect to the rotation of the abrasive roll assembly inside the apparatus is maintained and thus the rotation of the abrasive roll assembly is along the axis of the apparatus without any physical axis being provided above the abrasive roll assembly.

In the coupling mechanism, the shaft is vertical and runs through the sleeve and locknut means and the top end of the shaft terminates below the locking, disk and the shaft is capable of being rotated inside the sleeve to move it up or down and is capable of being locked with the lock nut on to the sleeve on the bottom end of it upon reaching the desired distance inside the sleeve.

In the coupling mechanism, the top end of the shaft is fixed to the bottom of the locking disk by means of screws such that the locking disk along with the shaft forms locking disk assembly.

In the coupling mechanism, the locking disk the shaft the rotating means and the guide and lock means are in circular shape. In the coupling mechanism, the apparatus is a milling apparatus.

In the coupling mechanism, the abrasive roll assembly is the last abrasive roll assembly from the top of the apparatus and the coupling mechanism is placed underneath said last abrasive roll assembly.

Referring to FIG. 2, particularly a coupling mechanism in uncoupled condition in accordance with an exemplary embodiment of the present invention is illustrated.

In this, the shaft is shown in unscrewed condition. That is, the shaft is shown just before being rotated upwards. Also, the locking disk is shown in uncoupled condition with the last abrasive roll assembly of the milling apparatus.

This coupling mechanism consists of circular Locking disk assembly, sleeve assembly, locknut and retainer ring. Sleeve assembly consists of sleeve, bearing and external circlip. Sleeve consists of internal left hand thread. Circular locking disk assembly consists of circular disk, shaft and screws. Shaft consists of external left hand thread. Sleeve assembly is placed in the circular groove in the bottom flange housing. Bearing retainer is fixed to bottom flange housing. Bearing Retainer holds the position of bearing. Circular locking disk assembly is placed in sleeve assembly by turning the locking disk assembly in anticlockwise direction.

Once all Abrasive roll assemblies are fixed to the feed screw or each other the Last abrasive roll assembly is placed on Flange housing. By turning the shaft in clockwise direction the locking disk assembly moves upwards. The shaft is rotated further until circular external conical surface 9a of the locking disk touches the circular internal conical surface of last abrasive roll assembly. Last abrasive roll assembly consists of 4 holes. Screws are fixed to the previously assembled abrasive roll assembly. As the locking shaft is tightened pins are aligned with the holes in the last abrasive assembly to give positive locking of last abrasive roll assembly. Once the locking disk touches the last abrasive roll assembly, shaft is further tightened along with last abrasive roll assembly until it touches with the previously assembled abrasive roll assembly. Locknut is tightened from bottom. This arrangement aligns the axis of abrasive roll assembly and the locking disk assembly. This also ensures the integrity of all the abrasive roll assemblies.

The present invention is developed in the view of the various points described above to provide a locking disk mechanism, which is simple in construction and can be maintained easily.

A locking disk assembly is provided comprising: a circular locking disk, a vertical shaft and a sleeve assembly.

The circular locking disk aids to be mounted with main shaft thereby this part is being precisely coupled with main shaft in terms of rotary movement and in terms of axial centre of main shaft.

The features of the present invention relating to the milling apparatus includes:

A circular locking disk with external conical surface to align the abrasive roll assembly and openings for air entry from bottom into the milling chamber area;

A shaft at the bottom with left hand external thread to lock the abrasive roll assemblies with the help of circular locking disk; and A sleeve assembly which facilitates the rotation of circular disk and for locking and unlocking the arrangement.

An essential advantage of the apparatus according to the invention is that simple construction, the wear parts and all other rotating parts which have to be maintained from time to time can be removed easily. In the present invention it is sufficient to release the perforated arcuate sheet cover assembly. This ensures the entire rotor assembly can be accessed very easily, by releasing the bottom locking disk assembly, abrasive roll can be removed easily and by releasing the interconnected screws sequential abrasive rolls can be removed easily without removing shaft assembly, pulley, and related parts from machine and without altering pulley alignment.

The advantage of present invention is simple in construction and helps in removing the abrasive roll quickly and effortlessly, improves aspiration inside the milling chamber. To remove last abrasive roll assembly the circular locking disk assembly is lowered by turning the lower ring nut. This releases the last abrasive roll assembly and lowers it along with locking disk assembly. After completely lowering the locking disk assembly (Unlocked condition), the last abrasive roll can be replaced.

Figure 3:
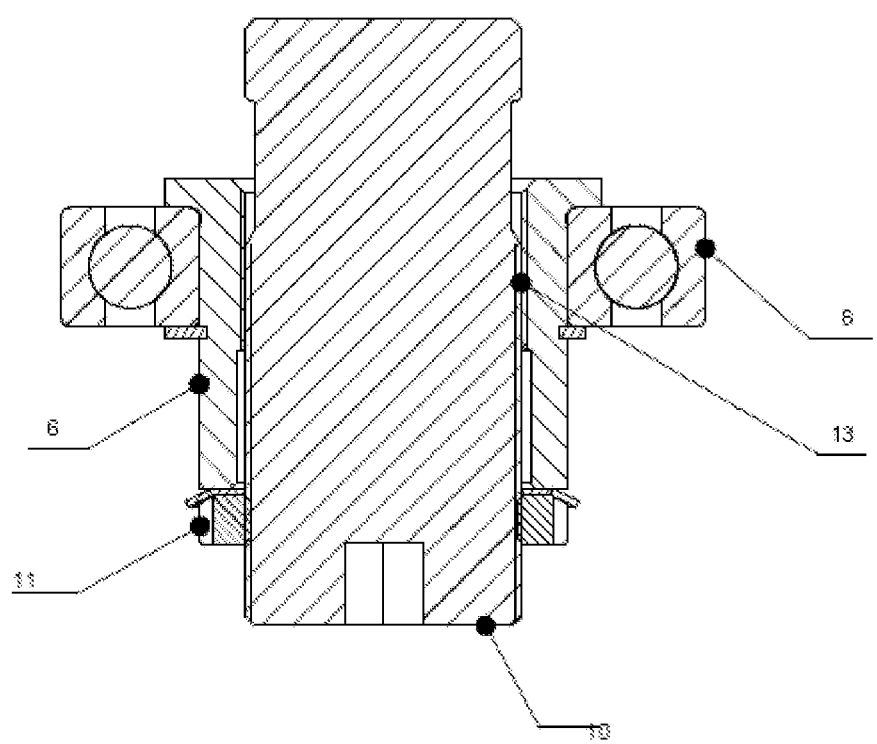
FIG. 3 illustrates a rotating mechanism in accordance with another exemplary embodiment of the present invention.

Referring to FIG. 3 a rotating mechanism in accordance with another exemplary embodiment of the present invention is illustrated. This illustrates a rotating mechanism for a milling apparatus to hold and to rotate a shaft. The rotating mechanism comprises a hollow sleeve (6) which has threading in its internal surface such that a shaft (10) which has a mating thread on its external surface can be threaded along the axis of the sleeve. A bearing (8) whose inner surface of is fixed to the outer surface the sleeve (6) and the outer surface of the bearing is fixed to the apparatus. A retainer ring is fixed on to the bearing and the sleeve such that the shaft can pass though it and the bearing is intact with the sleeve and the apparatus. A lock nut (11) which can be threaded on to the shaft from the bottom of the sleeve such that the shaft can be locked at desired position in the sleeve wherein shaft can be rotated with respect to the bearing precisely in its centre of axis and the axis of rotation is the axial centre of the apparatus.

In the rotating mechanism the thread present inside the sleeve and outside the shaft is left hand thread and the bearing is a ball bearing.

In the rotating mechanism a circlip (7) is provided at the bottom of the bearing such that the bearing is intact with the sleeve.

In the rotating mechanism the shaft sleeve along with bearing and circlip forms a sleeve assembly (4).

In the rotating mechanism the apparatus is a milling apparatus.

Figure 4:
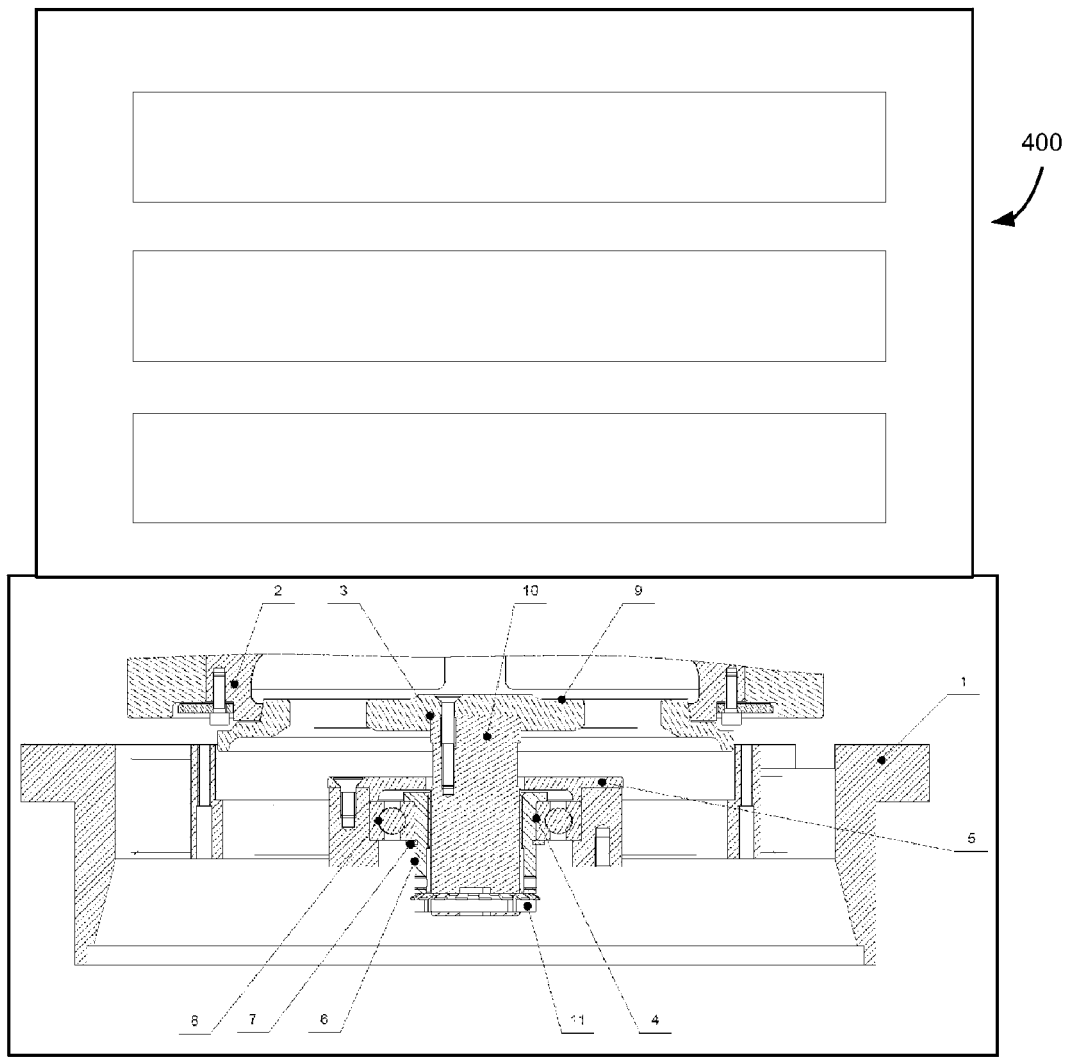
FIG. 4 illustrates a milling apparatus with the coupling mechanism and the bearing mechanism in accordance with yet another exemplary embodiment of the present invention.

Referring to FIG. 4 a milling apparatus with the coupling mechanism and the rotating mechanism in accordance with yet another exemplary embodiment of the present invention is illustrated. A milling apparatus comprises a locking disk (9) placed along an abrasive roll assembly (2) which is in association with the axial centre of the abrasive roll assembly. A shaft (10) fixed along the axial centre of said locking disk such that said shaft and said locking disk have common centre of axis. A rotating means (8), the outer surface of which is fixed to the body of the milling apparatus to form the stationary end and the inner surface of which is fixed to the outer surface of a hollow guide and lock means (6) to form the rotatable end such that said hollow guide and lock means is capable of being rotated with respect to said rotating means. The inner side of said hollow guide and lock means said shaft can be slide as desired to place said shaft in desired position inside said hollow guide and lock means and to hold it rigid in desired position inside said hollow guide and lock means wherein said locking disk can be moved as desired in accordance with said shaft movement such that said locking disk mates the abrasive roll assembly and holds the abrasive roll assembly intact with respect to the apparatus and that said shaft along with said locking disk can be rotated with respect to said rotating means and that the axis of rotation is along the axial centre of the milling apparatus. In the milling apparatus the hollow guide and lock means can be a mechanical thread which has a left hand thread or a right hand thread or any riveting or coupling means.

We claim:

1. A coupling mechanism for an abrasive roll assembly comprising:
    a locking disk in association with an axial center of an abrasive roll assembly;
    a shaft fixed along the axial center of the abrasive roll assembly such that the shaft and the locking disk have a common center of axis;
    a rotating means, an outer surface of which is fixed to a body of an apparatus to form a stationary end and an inner surface of which is fixed to an outer surface of a hollow guide and lock means to form a rotatable end such that the hollow guide and lock means is capable of being rotated with respect to the rotating means; and in an inner side of the hollow guide and lock means, the shaft is configured to slide as desired to place the shaft in a desired position inside the hollow guide and lock means and to hold it rigid in the desired position inside the hollow guide and lock means, wherein the locking disk is configured to be moved as desired in accordance with the shaft movement such that the locking disk mates the abrasive roll assembly and holds the abrasive roll assembly intact with respect to the apparatus and that the shaft along with the locking disk are configured to be rotated with respect to the rotating means, and that the axis of rotation is along the axial center of the abrasive roll assembly.

2. The coupling mechanism as claimed in claim 1 wherein the mating surfaces of the abrasive roll assembly and the locking disk are in sliding conical shape such that when the locking disk mates with the abrasive roll assembly it forms an intact mate and that the abrasive roll assembly is rigid with respect to the locking disk.

3. The coupling mechanism as claimed in claim 1 wherein one or more holes are provided on a surface of a last abrasive roll assembly such that when the locking disk is moved towards the abrasive roll assembly, the one or more holes align with respective pins present on the last abrasive roll assembly thereby providing positive locking of the locking disk with the abrasive roll assembly.

4. The coupling mechanism as claimed in claim 1 wherein the shaft has an external left hand thread and a sleeve has internal left hand thread such that the thread on the shaft can mate with the thread inside sleeve and the shaft thereby can be threaded and moved inside or outside the sleeve to desired distance along the sleeve.

5. The coupling mechanism as claimed in claim 1 wherein the center of axes of the locking disk, the shaft, the rotating means, and the guide and lock means are common and are same as that of the axes of the abrasive roll assembly and that of the apparatus thereby the integrity with respect to the rotation of the abrasive roll assembly inside the apparatus is maintained and thus the rotation of the abrasive roll assembly is along the axis of the apparatus without any physical axis being provided above the abrasive roll assembly.

6. The coupling mechanism as claimed in claim 1 wherein the shaft is vertical and runs through the sleeve and locknut means and the top end of the shaft terminates below the locking disk and the shaft is capable of being rotated inside the sleeve to move it up or down and is capable of being locked with the lock nut on to the sleeve on the bottom end of it upon reaching the desired distance inside the sleeve.

7. The coupling mechanism as claimed in claim 1 wherein the top end of the shaft is fixed to the bottom of the locking disk by means of screws such that the locking disk along with the shaft forms locking disk assembly.

8. The coupling mechanism as claimed in claim 1 wherein the locking disk the shaft the rotating means and the guide and lock means are in circular shape.

9. The coupling mechanism as claimed in claim 1 wherein the apparatus is a milling apparatus.

10. The coupling mechanism as claimed in claim 1 wherein the abrasive roll assembly is the last abrasive roll assembly from the top of the apparatus and the coupling mechanism is placed underneath the last abrasive roll assembly.

11. The coupling mechanism as claimed in claim 1, wherein a last abrasive roll assembly is configured to be coupled with the locking disk such that the axis of rotation of the last abrasive roll assembly is along the axis of rotation of the shaft and the abrasive roll assembly.

12. A milling apparatus comprising:
    a locking disk placed along an abrasive roll assembly which is in association with the axial center of the abrasive roll assembly;
    a shaft fixed along the axial center of the abrasive roll assembly such that the shaft and the locking disk have common center of axis;
    a rotating means, the outer surface of which is fixed to a body of the milling apparatus to form a stationary end and an inner surface of which is fixed to an outer surface of a hollow guide and lock means to form a rotatable end such that the hollow guide and lock means is capable of being rotated with respect to the rotating means, and in an inner side of the hollow guide and lock means, the shaft is configured to slide as desired to place the shaft in a desired position inside the hollow guide and lock means and to hold it rigid in the desired position inside the hollow guide and lock means, wherein the locking disk is configured to be moved as desired in accordance with the shaft movement such that the locking disk mates the abrasive roll assembly and holds the abrasive roll assembly intact with respect to the apparatus and that the shaft along with the locking disk are configured to be rotated with respect to the rotating means and that the axis of rotation is along the axial center of the abrasive roll assembly.

13. A milling apparatus as claimed in claim 12 wherein air is allowed to enter the milling apparatus from the bottom portion of the milling apparatus to the milling chamber.

14. A milling apparatus as claimed claim 12 wherein the hollow guide and lock means is a mechanical thread which has a left hand thread or a right hand thread.

* * * * *